G. D. BAILEY & F. E. RICE.
CLUTCH DIFFERENTIAL.
APPLICATION FILED MAY 4, 1914.
1,189,775.
Patented July 4, 1916.
4 SHEETS—SHEET 3.
Fig. 7
Fig. 6
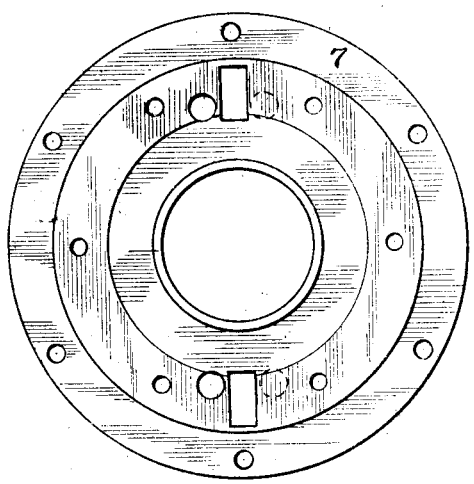
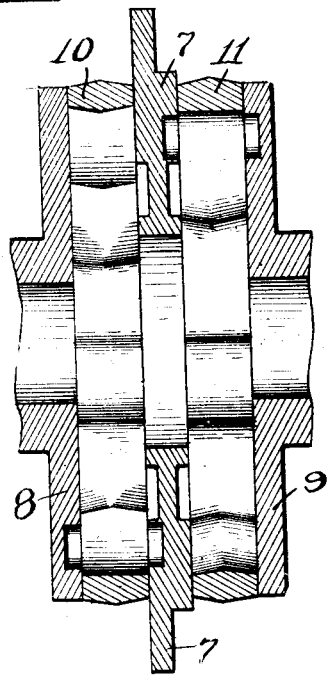
Fig. 8
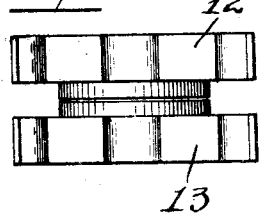
Fig. 5
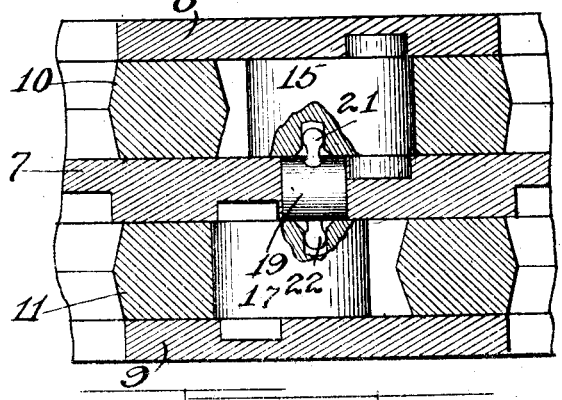
Witnesses
J. W. Angell
Charles W. Tillson
Inventors
George D. Bailey
Frank E. Rice
Charles W. Tillson Atty.

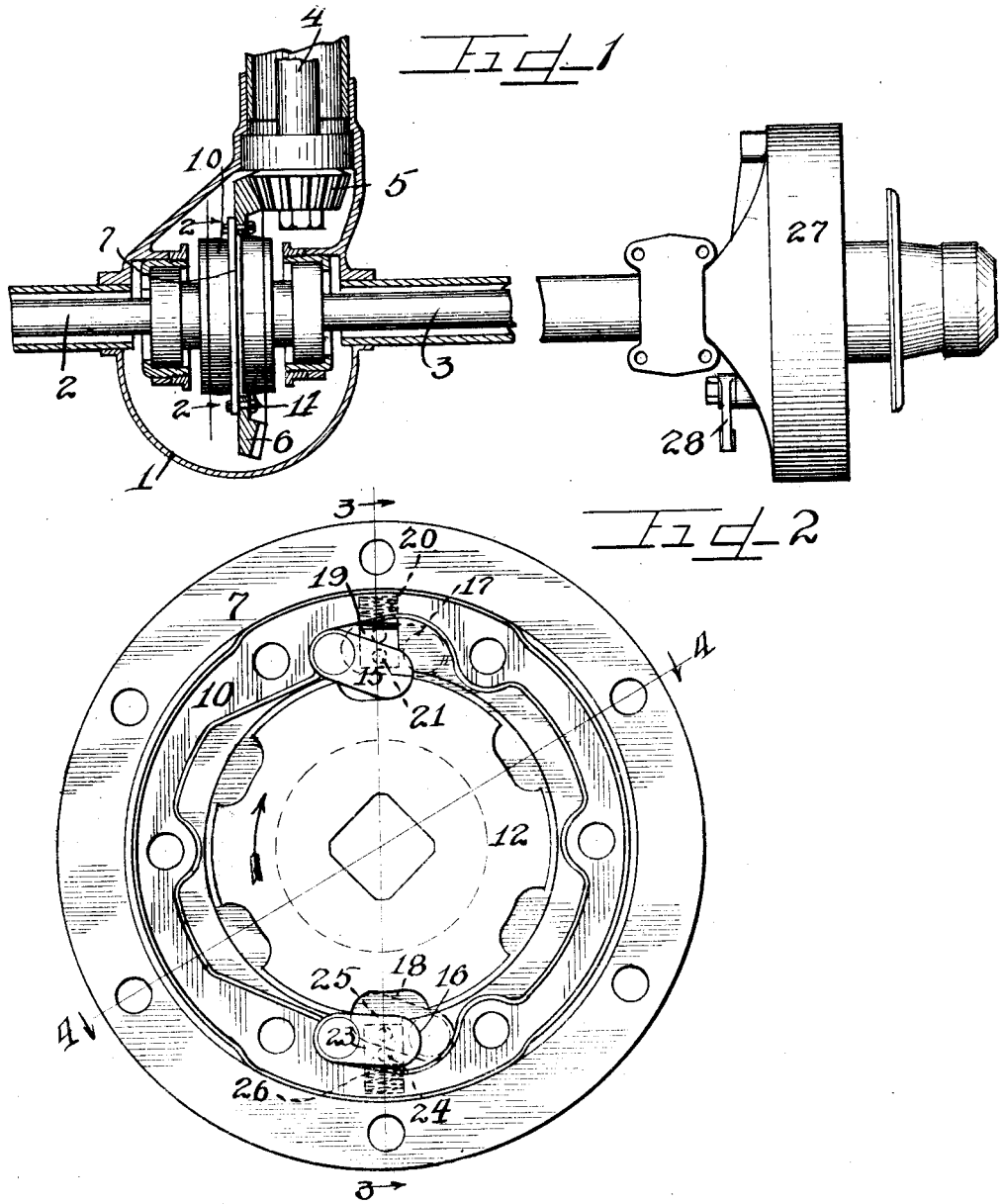

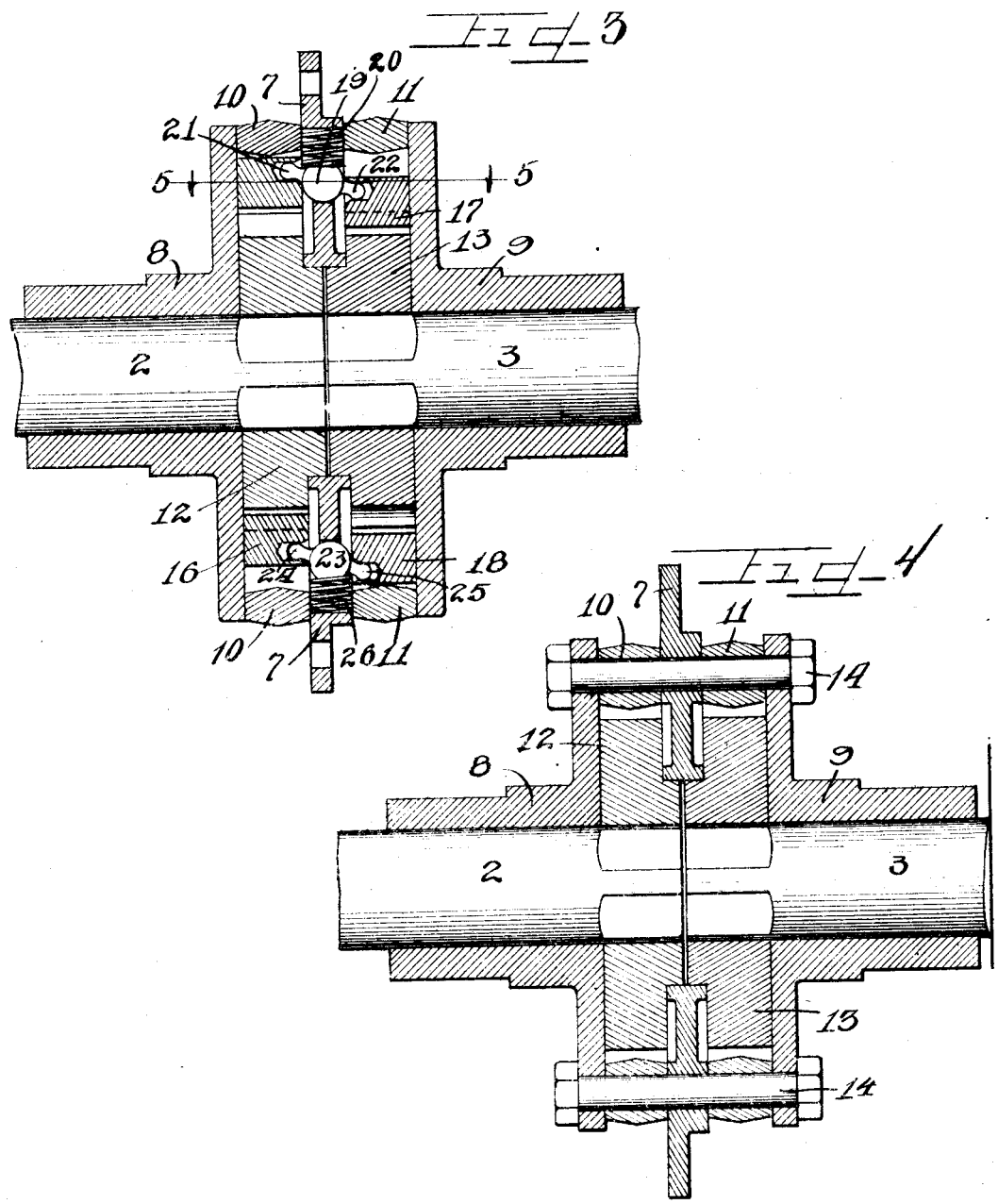

G. D. BAILEY & F. E. RICE.
CLUTCH DIFFERENTIAL.
APPLICATION FILED MAY 4, 1914.
1,189,775.
Patented July 4, 1916.
4 SHEETS—SHEET 4.
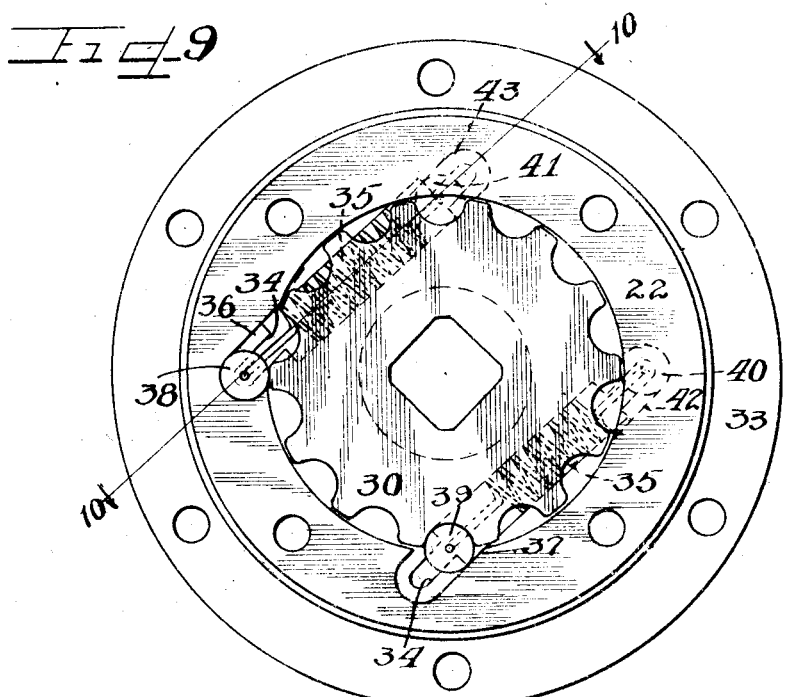
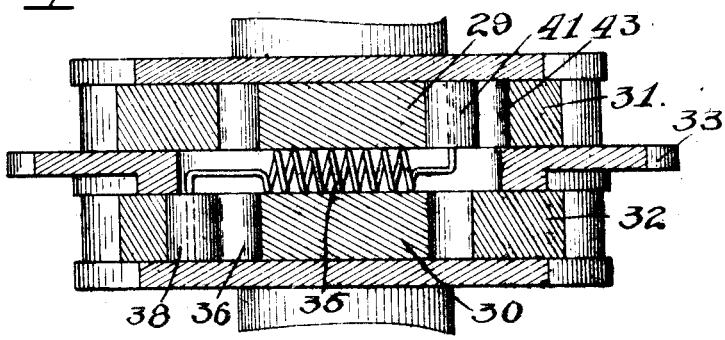

UNITED STATES PATENT OFFICE.

GEORGE D. BAILEY AND FRANK E. RICE, OF DETROIT, MICHIGAN, ASSIGNORS TO GEARLESS DIFFERENTIAL CO., A CORPORATION OF MICHIGAN.

CLUTCH-DIFFERENTIAL.

1,189,775.

Specification of Letters Patent.

Patented July 4, 1916.

Application filed May 4, 1914. Serial No. 836,074.

*To all whom it may concern:*

Be it known that we, GEORGE D. BAILEY and FRANK E. RICE, citizens of the United States, and residents of the city of Detroit, in the county of Wayne and State of Michigan, have invented certain new and useful Improvements in Clutch-Differentials; and we do hereby declare that the following is a full, clear, and exact description of the same, reference being had to the accompanying drawings, and to the numerals of reference marked thereon, which form a part of this specification.

This invention relates to a clutch mechanism adapted to be mounted upon the axle sections of the driving axle of a motor car in lieu of the ordinary differential, whereby power may be transmitted to the respective driving wheels secured on the ends of the axle and yet permitting a differential movement to take place when required.

One of the main objections to the ordinary type of differential gear is the fact that the power is always transmitted to the wheel to which the least resistance to rotation is encountered, so that in driving over a surface with one wheel on a slippery portion, skidding is very likely to occur. Oftentimes, too, through the application of the brakes acting unevenly on the respective wheels, skidding is the result.

By this invention it is possible to brake both wheels as a unit by applying the brakes to either one thereof, and the drive imparted to the wheels is equal when the wheels are rotating at the same speed, but in the event of a differential movement taking place therebetween, as in rounding corners, the drive is imparted to the slower rotating wheel, or the one to which the most resistance to rotation is encountered.

It is an object of this invention to construct a clutch mechanism mounted on a sectional driving axle, whereby a drive may be imparted to the respective axle sections and a differential movement permitted therebetween.

It is also an object of this invention to construct a device wherein ratchet members are secured upon the respective axle sections of a driving axle and rotate within rings connected to a driving gear, and with means for entraining said ratchet members with said driving gear to impart a drive from one to the other in either direction, and yet permitting differential movement to take place between said respective members.

It is also an object of this invention to construct a device wherein ratchet wheels are rigidly mounted upon the respective sections of a driving axle, each section having one of the vehicle wheels also secured thereon, and with power driven means adapted to rotate around said ratchet wheels and carrying small levers which act to move into engagement therewith to effect a driving connection therebetween.

It is also an object of this invention to construct a device wherein ratchets are rigidly secured upon the respective sections of a driving axle and disposed in a driving ring provided with pivoted levers adapted to effect driving connection between a pawl and its ratchet wheel, said levers connecting the pawls to cause retraction of one with a movement of the other into locking position, certain of said pawls being directed in one direction for one direction of drive, and the others directed oppositely thereto for the reverse direction of drive.

It is furthermore an object of this invention to construct a device wherein ratchet members are rigidly secured upon the respective axle sections of a driving axle with driving means disposed therearound, each of said driving means being provided with diametrically disposed pivoted locking pawls directed in opposite directions for forward and reverse directions of rotation, which, when moved into engagement with said respective ratchet members, effect a driving connection between said means and the same, and with levers connected between the adjacent driving pawls to withdraw one pawl with a movement of the other into driving position.

It is finally an object of this invention to construct a device simple in operation and acting effectually to transmit a drive to the rear wheels of a motor car, and yet permitting a differential movement to take place.

The invention (in a preferred form) is illustrated in the drawings and hereinafter more fully described.

In the drawings: Figure 1 is a fragmentary view partly in section and partly in elevation of the rear axle of a motor car. Fig. 2 is a view in elevation of one side of the device taken on line 2—2 of Fig. 1. Fig. 3 is a section taken on line 3—3 of Fig. 2. Fig. 4 is a section taken on line 4—4 of Fig. 2. Fig. 5 is a fragmentary section taken on line 5—5 of Fig. 3, with parts in elevation. Fig. 6 is a view similar to Fig. 3, but with the shafts and the recessed wheels omitted. Fig. 7 is a view somewhat similar to Fig. 2, with the recessed wheels and interlocking cams omitted. Fig. 8 is an edge view of the adjacent recessed wheels on the ends of the respective shaft sections. Fig. 9 is a view similar to Fig. 2, of a modified form of device. Fig. 10 is a section taken on line 10—10 of Fig. 9.

As shown in the drawings: The reference numeral 1, indicates as a whole the housing for the differential transmission mechanism for the rear axle sections 2 and 3, which receives the drive from the power plant of a vehicle to impart rotation to said sections. For this purpose the driving shaft 4, of the vehicle is provided with a small bevel pinion 5, meshing with a bevel gear 6. Said bevel gear 6, which is no more than a ring, is rigidly bolted to a driving ring 7, and the latter ring 7, is in turn bolted to hub members 8 and 9, respectively, which are journaled upon the shaft sections 2 and 3, and with spacing ring members 10 and 11, also held in position by said bolts, the member 10, being positioned between the hub member 8, and the ring 7, and the member 11, being held in position between the hub member 9, and said driving ring 7. The inner adjacent ends of the respective shaft sections 2 and 3, are squared, and rigidly secured on each thereof are the respective recessed wheels or ratchets 12 and 13, respectively, and the hub portion of said ring 7, extends therebetween and is journaled on short hub extensions of each thereof, the hub portion of the ring 7, serving to maintain said ratchet wheels 12 and 13, spaced from one another. The bolts which hold said hub bearing members 8 and 9, as well as said spacing ring members 10 and 11, associated rigidly with the ring 7, are denoted by the reference numeral 14. It is apparent, therefore, that said assembled element is free to rotate upon said shaft sections 2 and 3. For the purpose of effecting driving engagements between said assembled element and the ratchet wheels, pawls 15 and 16, are mounted in recesses in the driving ring 10, and pivoted in the bearing member 8, and the ring 7, as clearly shown in Fig. 5, and similarly pawls 17 and 18, are mounted in recesses in the driving ring 11, and are pivoted in the hub member 9, and in said ring 7. The pawl 15, as clearly shown in Fig. 2, is capable of driving the ratchet wheel 12, in the direction indicated by the arrow, whereas the pawl 17, adjacent thereto, is capable of driving the other ratchet wheel 13, in an opposite direction. The pawls 16 and 18, which are also mounted adjacent one another, have a similar function.

It is evident that in driving in a straight path, or at any time when the two wheels of the vehicle on the ends of the respective axle sections 2 and 3, move at the same rate of speed, that the pawl 15, engages with the ratchet wheel 12, and the pawl 18, engages with the recessed wheel 13, and the respective pawls 16 and 17, would be in retracted position, inasmuch as they only come into action when the direction of drive for the axles is reversed. Accordingly, means are provided for maintaining the respective adjacent pawls, for instance the pawls 15 and 17, in a position whereby when one is in driving position the other is in position out of use, and for this purpose a cylindrical pivot member 19, is mounted in an enlarged recess in the ring 7, and is held downwardly toward the inner end of said recess by means of a spiral compression spring 20. Small arms 21 and 22, respectively, having rounded ends, project radially from said cylinder 19, on opposite sides thereof, affording a tilting lever, and the arm 21, engages in a recess in the pawl 15, and the arm 22, engages in a similar recess in the pawl 17. It is apparent, therefore, by reference to Fig. 3, that the arms on said cylinder 19, act as a small walking beam to insure a positive retraction of one of the pawls when the other is moved into position for use. The spring 20, which holds the cylinder 19, at the inner end of the recess in the ring 7, permits the entire cylinder and arms to be elevated when both of said respective pawls 15 and 17, are impelled upwardly, as for instance when the ratchet wheel 12, rotates faster than its driving pawl. A similar cylinder 23, is mounted in said ring 7, diametrically opposite from said cylinder 19, and is provided with arms 24 and 25, affording another tilting lever, of which the arm 24, engages in the pivoted pawl 16, and the arm 25, engages in the pivoted pawl 18. Also a spiral compression spring 26, is provided to maintain the cylinder 23, at the inner end of its respective recess in the ring 7. Rigidly secured upon the housing for the respective axle sections is a protective casing 27, adapted to receive the brake drum of a wheel therein, and of course containing the expanding brake mechanism which is operated by a lever 28, provided for the purpose.

In the modification of our device illustrated in Figs. 9 and 10, in place of the ratchet wheels 12 and 13, we employ toothed wheels 29 and 30, with driving rings 31 and 32, respectively, mounted concentrically therearound. In this instance, in place of the bevel gear ring 7, we use a ring 33, which is provided with slots or grooves 34, in which the angled ends of springs 35, are adapted to move. Each of said toothed wheels 31 and 30, respectively, is provided with slots, said wheel 30, having one slot 36, affording an abutment facing in one direction and another slot 37, affording an abutment facing in another direction, one of said slots provided with a roller 38, to drive the toothed wheel 30, in one direction, and the other provided with a roller 39, to drive said toothed wheel in the opposite direction. Said rollers 38 and 39, are journaled on the angled extensions of the respective tension springs 35. On the other end of said tension springs 35, rollers 40 and 41, respectively, are journaled and are adapted to move in the respective slots 42 and 43, formed in the other toothed wheel 39. For instance, the roller 38, in the ring 30, is adapted to drive the axle in a reverse direction, whereas the roller 39, is adapted to drive the axle in a forward direction, and in this connection it is to be noted that the roller for reverse rotation of the axle, referring to said toothed wheel 30, is connected by means of the spring 35, to the roller 41, for forward direction of the toothed wheel 29, and likewise the roller 40, for reverse rotation of the toothed wheel 29, is connected by means of the other spring 35, with the roller 39, for forward direction of rotation of said wheel 30.

The operation is as follows: In this construction the respective axle sections are driven in a manner to permit differential movement of each thereof, although the driving elements for each of said sections are rigidly connected to one another and move as a single unit, being driven by the bevel gear 6, from the driving pinion 5. The drive is transmitted from the respective connected driving ring 7, hub members 8 and 9, and rings 10 and 11, by the respective pivoted pawls 15 and 18, which serve to drive said respective axle sections simultaneously and in the same forward direction as indicated by the arrow in Fig. 2, whereas the pawls 16 and 17, are adapted to drive the respective axle sections through the toothed wheels 12 and 13, respectively, in a reverse direction. It is obvious, therefore, that when the respective pawls 15 and 18, are driving the axle sections in one direction, that the other pawls should be held in position out of use, and this is accomplished by the cylindrical members 19 and 23, the member 19, of which, with its respective arms, acts as a tilting lever or walking beam between the pawls 15 and 17, and the cylinder 23, acting with its arms similarly as a walking beam between the pawls 16 and 18, respectively. Thus when the pawls 15 and 18, are in driving engagement connecting the ring 10, and ratchet wheel 12, to one another, and the respective ring 11, with the wheel 13, the pawls 16 and 17, are moved out of driving position, the action of the walking beam in this case being clearly shown in Fig. 3. In the event that in turning a corner one of the axle sections is caused to rotate faster than its respective driving ring, of course the locking driving pawl is caused to be elevated automatically, due to the fact that it tracks over the ratchet wheel, and owing to the fact that the cylindrical members 18 and 23, are held in the recesses by springs, the entire walking beam member is elevated or moved outwardly in its respective recess, so that both of the pawls which it controls are out of operating position for the time being.

In the modification of our invention illustrated in Figs. 9 and 10, in place of the pivoted pawls we have used rollers journaled on the angled ends of tension springs, the springs 35, connecting the forward driving roller of one toothed wheel and driving ring with the reverse driving roller of the other driving ring and toothed wheel. The operation is very similar in this instance, that is to say when the driving roller is in engagement with the respective toothed wheel of one axle section, the reverse roller of the other toothed wheel and axle section is held out of engagement, but in the event of a coasting effect taking place, that is the toothed wheel rotating faster than the ring with which it is operatively connected, the roller is forced out of engagement therewith, and both of the connected rollers on the ends of the springs are thus held out of position, the spring stretching to allow this to take place.

We are aware that various details of construction may be varied through a wide range without departing from the principles of this invention, and we therefore do not purpose limiting the patent granted otherwise than necessitated by the prior art.

We claim as our invention:

1. In a device of the class described, a sectional axle, ratchet wheels rigidly secured on the axle sections, spacing rings journaled about each of said wheels and rigidly connected together, pawls having recesses therein mounted in each of said rings, one pawl of each ring adapted to drive a ratchet wheel in one direction and the other to drive the wheel in the other direction; and a tilting lever with its ends engaged in the recesses of adjacent pawls on said respective rings for maintaining the respective reverse driving pawls of each ring out of driving engagement when the forward driving pawls are in driving position.

2. The combination with a sectional driving axle, of rotatable hub members, ratchet wheels, one ratchet wheel secured on each of said axle sections and rotatable therewith independently of one another, a bevel gear carrying ring journaled between said ratchet wheels, rings on each side thereof rigidly connected thereto and to one another and one journaled concentrically about each of said ratchet wheels, pawls journaled in said hub members and said gear carrying ring and adapted to move through recesses in said rings, certain ones thereof adapted to transmit a drive from said associated rings to said ratchet wheels for rotation in one direction, and others for transmitting a drive for rotation in the opposite direction, a bevel gear rigidly secured to said gear carrying ring, and means driving said bevel gear.

3. In a differential releasing clutch mechanism a sectional driving axle, ratchet wheels, one rigidly secured on each of the respective axle sections, rotatable hub members on the outer side of each of said ratchet wheels, a driving ring between said ratchet wheels, spacing rings between said hub members and said driving ring, one disposed concentrically about each of said respective ratchet wheels, pivoted pawls journaled in said hub members and spacing rings and movable for engagement with the ratchet wheels to drive the same in either direction, and means retracting certain of said pawls when certain others thereof are in driving position.

4. In a device of the class described the combination with a sectional driving axle, of rigidly connected rotatable hub members and a driving ring, ratchet wheels secured on the respective axle sections intermediate said hub members and driving ring, spacing rings disposed between said hub members and said driving ring and concentric about said ratchet wheels, pawls carried by said hub members and driving ring adapted to effect driving engagement between said ring and said ratchet wheels, pivoted tilting levers mounted in said driving ring and engaging the adjacent pawls for the respective ratchet wheels to cause elevation of one pawl with a lowering of the other insuring the pawls for one direction of rotation being moved into inoperative position when the pawls for the other direction of rotation are in driving position.

5. In a device of the class described a sectional driving axle, a driving ring, a bevel gear thereon, spacing rings rigidly connected on each side of said driving ring, hub sections connected to said rings and journaled on the axle sections of the sectional driving axle, ratchet wheels on the driving axle sections concentric with said respective spacing rings, pawls pivoted on said driving ring and hub members adapted to engage said ratchet wheels to drive the same in either direction, and to permit a relative movement to take place therebetween, and tilting levers connecting adjacent pawls whereby one of said pawls is elevated out of driving position when the other is in driving position.

6. In a device of the class described the combination with ratchet wheels and hub members and rings adapted to drive the same, of pivotally mounted pawls thereon adapted to coact with said ratchet wheels to effect driving engagement between said associated hub members and rings and said ratchet wheels, and tilting spring impelled levers connecting the respective adjacent pawls whereby when one of said pawls is in driving engagement the other is held out of engagement.

7. In a device of the class described a sectional driving axle, ratchet wheels rigidly secured upon the respective sections thereof adjacent one another, pawls for driving said wheels but permitting the wheels to rotate faster than said pawls, and tilting levers associated with said pawls to insure the same driving both of said respective wheels in the same direction when in a driving position.

8. In a device of the class described a sectional driving axle, ratchet wheels secured on the abutting ends of the driving axle sections, driving mechanisms journaled therearound, pawls pivoted on said mechanisms adapted to effect driving engagement between said mechanisms and wheels in both directions, the pawls for effecting said driving engagement for different directions of rotation being mounted adjacent one another, and connections therebetween for holding one of said adjacent pawls out of driving position when the other is in driving position.

9. In a device of the class described the combination with a sectional driving axle, of ratchet wheels secured on the axle sections, pawl carrying means journaled on said wheels and disposed therebetween, pivotally mounted pawls on said means, one pawl of each means adapted to drive the ratchet wheels in one direction and the other to drive the ratchet wheels in the other direction, and tilting mechanism mounted transversely of the device with its ends engaged in recesses of adjacent pawls for maintaining the respective reverse driving pawls of one ring out of driving engagement when the forward driving pawls of the other ring are in driving engagement.

10. In a device of the class described the combination with a sectional driving axle, of rigidly connected hub members, and a driving ring, ratchet wheels secured on the respective axle sections and disposed between said hub members and driving ring, pivotally mounted pawls carried by said hub members and driving ring, adapted to effect driving engagement between said ring and said ratchet wheels, and tilting levers pivotally mounted transversely in said driving rings and engaging the adjacent pawls to elevate one out of engaged position when the other is engaged in driving position.

11. In a device of the class described the combination with ratchet wheels and rings adapted to drive the same, of pivotally mounted pawls adapted to interlock with said ratchet wheels to effect driving engagement between the same and said rings, and tilting levers engaging adjacent oppositely directed pawls acting when one of said pawls is in driving engagement to hold the other adjacent pawl out of engagement.

In testimony whereof we have hereunto subscribed our names in the presence of two subscribing witnesses.

GEORGE D. BAILEY.
FRANK E. RICE.

Witnesses:
CHARLES W. HILLS, Jr.,
FRANK K. HUDSON.